United States Patent
Xiao

(10) Patent No.: US 9,710,618 B2
(45) Date of Patent: Jul. 18, 2017

(54) DIGITAL RIGHTS MANAGEMENT BASED ON FORMATTING FEATURE

(71) Applicant: Empire Technology Development LLC, Wilmington, DE (US)

(72) Inventor: Zhen Xiao, Haidian District (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/432,123

(22) PCT Filed: May 14, 2014

(86) PCT No.: PCT/CN2014/077437
§ 371 (c)(1),
(2) Date: Mar. 27, 2015

(87) PCT Pub. No.: WO2015/172327
PCT Pub. Date: Nov. 19, 2015

(65) Prior Publication Data
US 2016/0246948 A1  Aug. 25, 2016

(51) Int. Cl.
*H04L 29/06* (2006.01)
*G06F 21/10* (2013.01)
(Continued)

(52) U.S. Cl.
CPC .............. *G06F 21/10* (2013.01); *G06F 17/16* (2013.01); *G06F 21/6218* (2013.01); *G06F 2221/0724* (2013.01)

(58) Field of Classification Search
CPC ............................ G06F 21/10; H04L 2209/60
See application file for complete search history.

(56) References Cited

U.S. PATENT DOCUMENTS 7,406,174 B2 * 7/2008 Palmer ................. H04L 9/0662
380/28
2005/0175180 A1  8/2005 Venkatesan et al.
(Continued)

FOREIGN PATENT DOCUMENTS

EP  0994425 A2  4/2000

OTHER PUBLICATIONS

"Legimi Watermark is software for eBooks' distributors and eBookstores, which was developed to protect copyrights," accessed at https://web.archive.org/web/20131211211132/http://biz.legimi.com/en/services/watermark/?, accessed on Mar. 2, 2015, pp. 3.
(Continued)

*Primary Examiner* — Jason K Gee
(74) *Attorney, Agent, or Firm* — Moritt Hock & Hamroff LLP; Steven S. Rubin, Esq.

(57) ABSTRACT

Technologies are generally described for methods and systems effective to generate modified content data. In some examples, the methods may include obtaining, by a processor, identification data associated with an identification. The processor may generate offset data using the identification data, where the offset data may include an indication of the identification. The processor may determine first position data that may be effective to define a first position of a first object and a second position of a second object in a source document that corresponds to source content data. The processor may generate second position data using the offset data and the first position data. The second position data may be effective to define a third position of the first object and a fourth position of the second object. The processor may generate the modified content data by application of the second position data to the source content data.

22 Claims, 7 Drawing Sheets

(51) Int. Cl.
 *G06F 17/16* (2006.01)
 *G06F 21/62* (2013.01)

(56) References Cited

U.S. PATENT DOCUMENTS

2007/0014429 A1* 1/2007 He .................... G06F 17/212
 382/100
2009/0083268 A1* 3/2009 Coqueret .............. G06F 8/71
2013/0024756 A1 1/2013 Basso et al.

OTHER PUBLICATIONS

"New German digital right management named SIDIM will stop eBook piracy," accessed at bg-daily-news.eu/technology/2804-new-german-digital-rght-management-named-sidim-will-stop-ebook-piracy, posted on Jun. 17, 2013, pp. 1-2.
Andy., "Ebook Sellers Strike Deal to Share Customer Details With Anti-Piracy Outfit," accessed at https://web.archive.org/web/20140325044308/http://torrentfreak.com/down-torrent-pirates-130813/, posted on Aug. 13, 2013, pp. 2.
International Search Report and Written Opinion for International Patent Application No. PCT/CN2014/077437 mailed Feb. 17, 2015, 12 pages.
Schoff, J., "New DRM 'text watermarks' link pirated ebooks to their original uploader," accessed at https://web.archive.org/web/20140103013146/http://www.techspot.com/news/52931-new-drm-text-watermarks-link-pirated-ebooks-to-their-original-uploader.html, posted on Jun. 17, 2013, pp. 6.

* cited by examiner

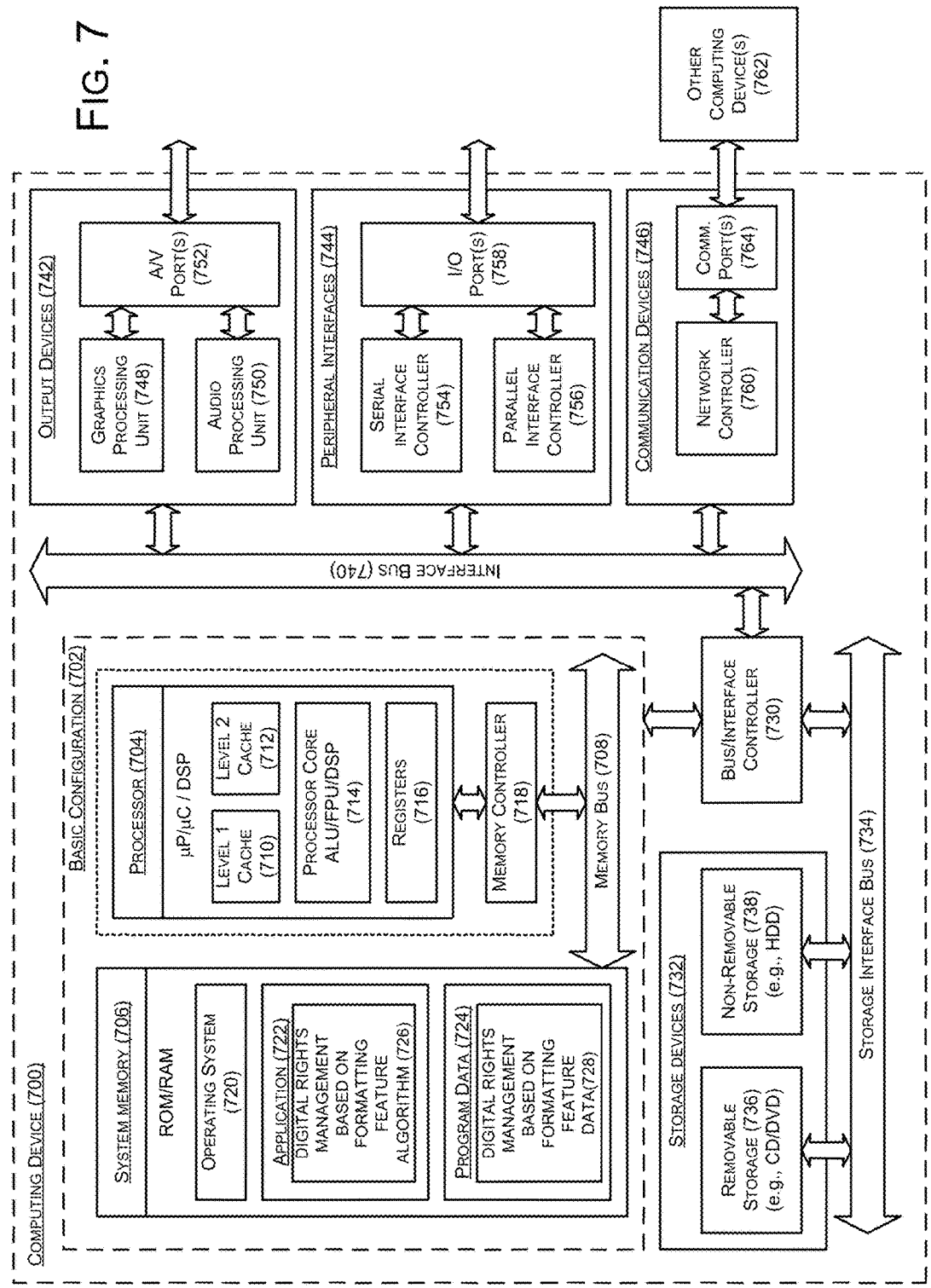

DIGITAL RIGHTS MANAGEMENT BASED ON FORMATTING FEATURE

CROSS-REFERENCE TO RELATED APPLICATION

This application is a U.S. National Stage filing under 35 U.S.C. §371 of International Application Ser. No. PCT/CN2014/077437 filed on May 14, 2014. The disclosure of the PCT Application is hereby incorporated herein by reference in its entirety.

BACKGROUND

Unless otherwise indicated herein, the materials described in this section are not prior art to the claims in this application and are not admitted to be prior art by inclusion in this section.

Access control technologies such as digital rights management may be implemented by a publisher to control access to published digital content such as electronic books. A malevolent user may use various techniques to override restrictions set by digital rights management. As a result of the override, the malevolent user may generate copies and/or circulate the digital content without consent from the publisher.

SUMMARY

In some examples, methods to generate modified content data are generally described. The methods may include obtaining, by a processor, identification data associated with an identification. The methods may also include generating, by the processor, offset data using the identification data, where the offset data may include an indication of the identification. The methods may also include determining, by the processor, first position data that may be effective to define a first position of a first object and a second position of a second object in a source document that corresponds to source content data. The methods may also include generating, by the processor, second position data using the offset data and the first position data. The second position data may be effective to define a third position of the first object and a fourth position of the second object. The methods may also include generating, by the processor, the modified content data by application of the second position data to the source content data.

In some examples, methods to retrieve an identification from modified content data are generally described. The methods may include obtaining, by a processor, the modified content data, where the modified content data may include first position data. The first position data may be effective to define a first position of a first object and a second position of a second object in a modified document. The modified document may correspond to the modified content data. The methods may also include determining, by a processor, second position data that may be effective to define a third position of the first object and a fourth position of the second object in a source document. The source document may correspond to source content data. The methods may also include generating, by a processor, difference data using the first position data and the second position data. The methods may also include determining, by a processor, the identification from the difference data.

In some examples, systems effective to generate modified content data are generally described. The systems may include a memory. The memory may be configured to store source content data associated with a source document. The source content data may include first position data that may be effective to define a first position of a first object and a second position of a second object in the source document. The systems may also include a processor. The processor may be configured to be in communication with the memory. The processor may be configured to obtain identification data associated with an identification. The processor may also be configured to generate offset data with use of the identification data. The offset data may include an indication of the identification. The processor may also be configured to determine the first position data. The processor may also be configured to generate second position data using the offset data and the first position data. The second position data may be effective to define a third position of the first object and a fourth position of the second object. The processor may also be configured to generate the modified content data by application of the second position data to the source content data. The processor may also be configured to store the modified content data in the memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement digital rights management based on a formatting feature, all arranged according to at least some embodiments described herein.

DETAILED DESCRIPTION

Figure 1:
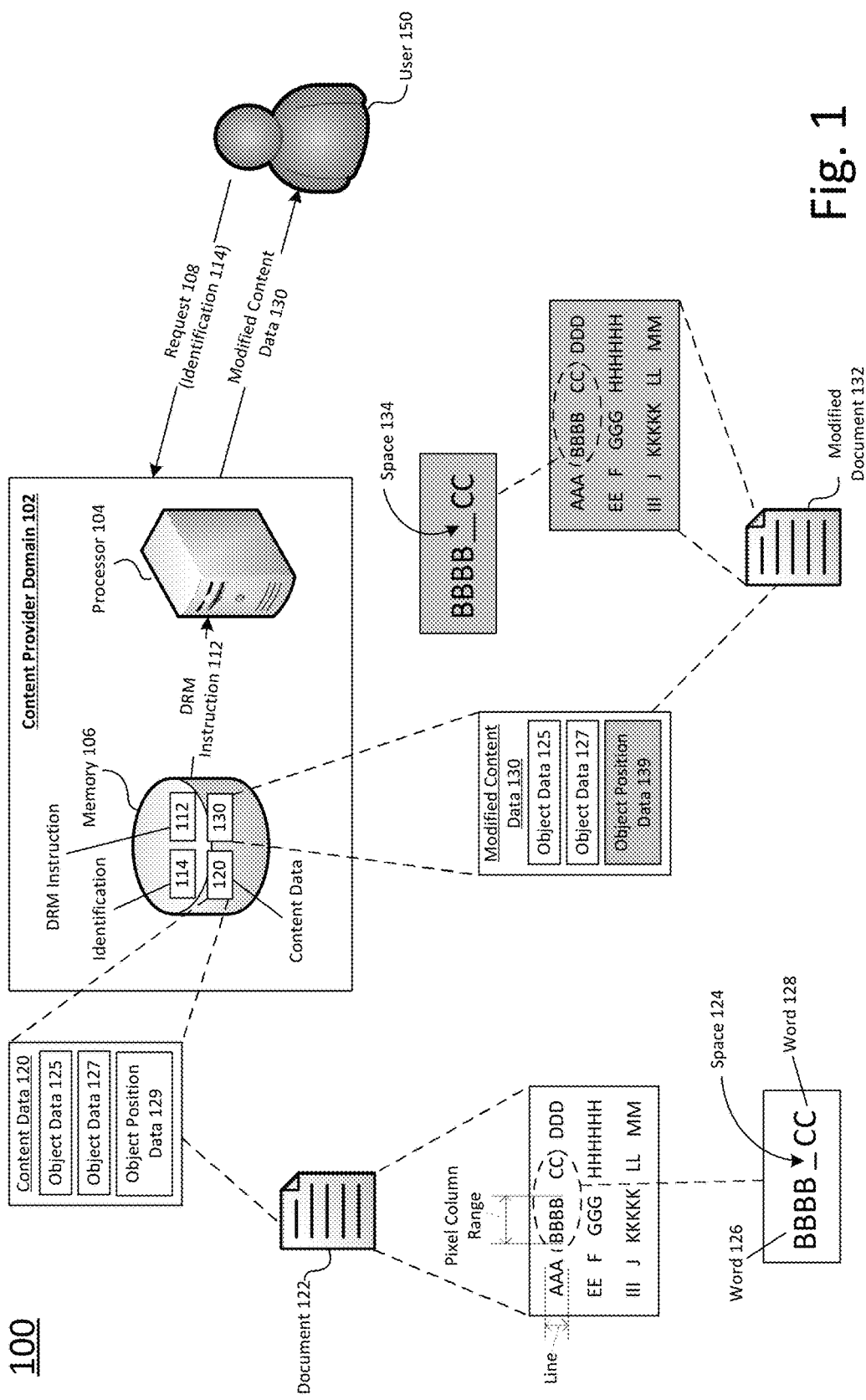
FIG. 1 illustrates an example system that can be utilized to implement digital rights management based on a formatting feature.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to digital rights management based on a formatting feature.

Briefly stated, technologies are generally described for methods and systems effective to generate modified content data that may correspond to a modified version of a source document. The source document may either be an "original" document or a copy of an original document. In some examples, the methods may include obtaining, by a processor, identification data associated with an identification, such as a user's identification. The user's identification may identify information relating to the user such as the user's name, phone number, address, etc. The processor may also generate offset data using the identification data, where the offset data may include an indication of the identification. For example, a hash of the user's identification may be used to generate an offset matrix. The processor may also determine first position data that may be effective to define a first position of a first object and a second position of a second object in a source document that corresponds to source content data. For example, the objects may be words and the position data may be locations of the words in the document. The processor may also generate second position data using the offset data and the first position data. The second position data may be effective to define a third position of the first object and a fourth position of the second object. For example, the processor may generate new locations for the words based on their original locations and the hash of the user identification. The processor may also generate the modified content data by application of the second position data to the source content data. The modified content data may correspond to the source content but with the words moves, or formatting features modified in a manner to reflect the hash of the user's identification.

FIG. 1 illustrates an example system 100 that can be utilized to implement digital rights management based on a formatting feature, arranged in accordance with at least some embodiments described herein. System 100 may include a content provider domain 102. Content provider domain 102 may include a processor 104 and/or a memory 106. Processor 104 and/or memory 106 may be configured to be in communication with each other. Memory 106 may be configured to store content data associated with content such as documents, images, videos, etc. For example, memory 106 may store content data 120 associated with content such as a document, an electronic book, etc. Content data 120, when rendered on a display, may produce a document 122. Content data 120 may include object data that is associated with objects such as numbers and/or letters, etc. For example, content data 120 may include object data 125 associated with a word 126 in document 122, and may include object data 127 associated with a word 128 in document 122.

Content data 120 may further include object position data 129 that may be effective to define positions of objects in document 122. Object position data 129 may include data such as line numbers and pixel column ranges. For example, object position data 129 may indicate that word 126, which may be of a width of 400 pixel columns, may be positioned on "line 1, pixel column 401 to 800" in document 122. Object position data 129 may indicate that word 128, which may be of a width of 200 pixel columns, may be positioned on "line 1, pixel column 901 to 1100" in document 122. Processor 104 may render content data 120 to produce document 122 by positioning objects in lines and column ranges defined by object position data 129. Formatting features of document 122 may be defined as a result of positioning objects in lines and column ranges defined by object position data 129. Examples of formatting features may include spaces between words, commas, periods, colons, or lines in a document, alignment of paragraphs in a document, margins of a page of a document, etc. For example, a space 124 may be formed between word 126 and word 128 in document 122. Each space 124 in document 122 may be of a same width, such as 100 pixel columns. In some examples, each space 124 in document 122 may be of different widths as a result of a format and/or an alignment of document 122.

Memory 106 may be further configured to store a digital rights management ("DRM") instruction 112 effective to generate modified content data 130. Modified content data 130, when rendered on a display, may produce a modified document 132. Modified content data 130 may include object data associated with objects such as numbers and/or letters, etc. Generation of modified content data 130 may include an application of object position data 139 to content data 120. Application of object position data 139 to content data 120 may include replacing object position data 129 with object position data 139. Object position data 139 may be effective to define positions of objects in modified document 132 and may include data such as line numbers and pixel column ranges. Modified content data 130 may include the same object data as content data 120, but may include different object position data. For example, modified content data 130 may include object data 125, 127, and object position data 139 that may be different from object position data 129 of content data 120.

Processor 104 may be further configured to execute DRM instruction 112 to generate modified content data 130. Processor 104 may render modified content data 130 to produce modified document 132 by positioning objects in lines and column ranges defined by object position data 139. Modified document 132 and document 122, when displayed, may show the same contents but may include different formatting features. For example, the application of object position data 139 to content data 120 may modify space 124 in document 122. As a result of the modification, a space 134 may be formed between word 126 and word 128 in modified document 132. Space 134 in modified document 132 may be of a different size from other spaces in modified document 132.

In an example, a user 150 may send a request 108 to content provider domain 102, where request 108 may be a request for document 122. In some examples, request 108 may be a request to purchase document 122. Request 108 may include an indication of an identification 114 associated with user 150. For example, identification 114 may include indications of a name, address, phone number, or payment information associated with user 150. Processor 104 may receive request 108 and in response, may retrieve DRM instruction 112 from memory 106. Processor 104 may execute DRM instruction 112 to generate modified content data 130 and may send modified content data 130 to user 150. Modified content data 130 includes the same content as requested document 122. Processor 104 may further store modified content data 130 in memory 106.

Figure 2:
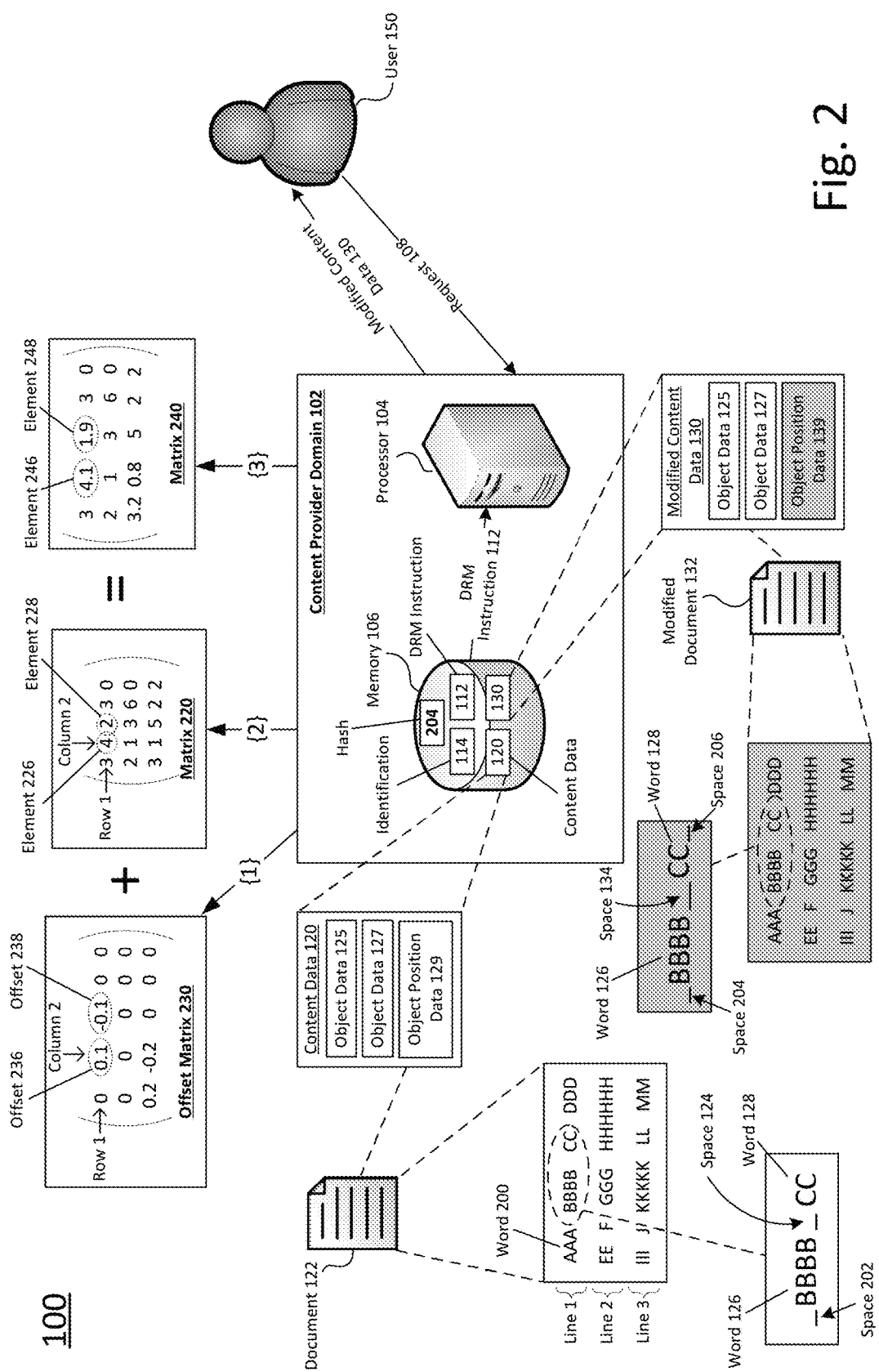
FIG. 2 illustrates the example system of FIG. 1 with additional detail relating to generation of modified content data.

FIG. 2 illustrates the example system 100 of FIG. 1 with additional detail relating to generation of modified content data, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

As will be described in more detail below, processor 104 may execute DRM instruction 112 to generate modified content data 130 from the application of object position data 139 to content data 120. Generation of modified content data 130 may include transforming, such as by processor 104, object position data 129 and/or identification 114 into numerical representation such as a matrix—described in more detail below. Processor 104 may perform matrix operations on the matrices to generate object position data 139. In response to generation of object position data 139, processor 104 may apply object position data 139 to content data 120 to generate modified content data 130.

Generation of modified content data 130 may begin with obtaining identification 114, such as extracting data from request 108, received by processor 104 from user 150. Processor 104 may execute DRM instruction 112 to transform identification 114 into an offset matrix 230. Transformation of identification 114 into offset matrix 230 may include hashing identification 114 to generate a hash 204 associated with identification 114. Processor 104 may execute DRM instruction 112 to hash identification 114 using existing hash functions such as MD5 (message-digest algorithm), SHA-1 (secure hash algorithm), etc. Processor 104 may generate offset matrix 230 based on indications provided by hash 204 (described below). Offset matrix 230 may include one or more elements, such as an offset 236 and an offset 238, effective to modify positions of objects in document 122. Elements in offset matrix 230 may be arranged in rows and columns. For example, offset 236 may be an element in "row 1" and "column 2" of offset matrix 230.

In an example, to transform identification 114 into offset matrix 230 (depicted as operation {1}), identification 114 may be "abcdefg". Processor 104 may hash "abcdefg" (identification 114) to generate a hash "35121312" (hash 204). Processor 104 may analyze hash 204 to determine offsets in offset matrix 230. Processor 104 may analyze a first digit and a second digit of hash 204 ("3" and "5") and may generate an empty matrix with "3 rows" and "5 columns". Processor 104 may analyze a third digit, fourth digit, and fifth digit of hash 204 ("1", "2", and "1") and may determine that a value of an offset (offset 236) in "row 1" and "column 2" in offset matrix 230 is "0.1". Processor 104 may analyze a sixth digit, seventh digit, and eighth digit ("3", "1", and "2") may determine that a value of an offset in "row 3" and "column 1" in offset matrix 230 is "0.2".

In response to determination of a positive value (e.g., greater than zero) of an offset in offset matrix 230, processor 104 may determine a negative value (e.g., less than zero), which may be of a same magnitude as the positive offset, of an offset in offset matrix 230. For example, in response to the determination that offset 236 in offset matrix is "0.1", processor 104 may determine that offset 238 in offset matrix is "−0.1". In some examples, an offset in matrix 230 may indicate an addition of pixel columns. As offsets 236, 238 may correspond to spaces, processor 104 may determine the additive inverse of the offset to ensure that lines in modified document 132 end at the same location. For example, an offset of "0.1" may indicate an addition of one pixel column to the number of pixel columns associated with an object, such as a particular word, comma, period, or colon, in document 122. For example, an offset of "0.2" may indicate an addition of two pixel columns to the number of pixel columns associated with an object in document 122. Similarly, an offset "−0.1" in matrix 230 may indicate a subtraction of one pixel column. For example, an offset of "−0.1" may indicate a subtraction of one pixel column from the number of pixel columns associated with an object in document 122. In some examples, an offset in matrix 230 may indicate percentage relating to a position change of an object. In some examples, offset in matrix 230 may be represented as integers such as "1" or "2", etc. In some examples, offset in matrix 230 may indicate an addition or subtraction of pixels in two dimensional space, such as adding a first pixel in a first direction, and adding a second pixel in a second direction which may be perpendicular to the first direction.

Processor 104 may retrieve source content data 120 from memory 106 and, in response, may retrieve object position data 129 from content data 120. Processor 104 may execute DRM instruction 112 to transform at least a portion of object position data 129 into a matrix 220 (depicted as operation {2}). In some examples, hash 204 may include an indication of the portion of object position data 129 to be transformed. For example, hash 204 may indicate a page number, a line number, and/or a particular letter, etc. Matrix 220 may include one or more elements such as an element 226 and an element 228. Elements in matrix 220 may be arranged in rows and columns, where each row refers to a line in document 122 and each column refers to a position of an object in a respective row. For example, element 226 may be an element in "row 1" and "column 2" of matrix 220, which may indicate that element 226 is associated with a second object of line 1 in document 122. In the example, element 226 of matrix 220 may be associated with word 126 in document 122 and element 228 may be associated with word 128 in document 122.

In some examples, a value of an element of matrix 220 may indicate a size of an object, such as a number of pixel columns, between two spaces in document 122. For example, element 226 of matrix 220 may be of a value of "4" to indicate that word 126 is of a size "400 pixel columns", or there are "400 pixel columns" between a space 202 and space 124 in document 122. In some examples, a change of size of an object in document 122 may be effective to change a position of the object in document 122. For example, element 226 of matrix 220 may be of a value of "4" to indicate that word 126 is at a position including "400 pixel columns" between space 202 and space 124. If word 126 is resized to "401 pixel columns", word 126 may be at a position including "401 pixel columns" between space 202 and space 124, which may be a different position due to the different pixel columns being occupied by word 126.

After transforming at least a portion of content data 120 into matrix 220, processor 104 may sum offset matrix 230 and matrix 220 to generate a matrix 240 (depicted as operation {3}). Matrix 240 may include one or more elements such as an element 246 and an element 248. Elements in matrix 240 may be arranged in rows and columns, where each row refers to a line in modified document 132 and each column refers to a position of an object in a respective row. In the example, element 246 of matrix 220 may be associated with word 126 in modified document 132, and element 248 of matrix 220 may be associated with word 128 in modified document 132.

In some examples, a value of an element of matrix 240 may indicate a size of an object, such as a number of pixel columns, between two spaces in modified document 132. For example, element 246 of matrix 240 may be of a value of "4.1" to indicate that word 126 is of a size "401 pixel columns" (as mentioned above, "0.1" may indicate addition of one pixel column), or there are "401 pixel columns", between a space 204 and space 134 in modified document 132. Element 248 of matrix 220 may be of a value of "1.9" to indicate that there are "199 pixel columns" (as mentioned above, "−0.1" may indicate subtraction of one pixel column) between a space 206 and space 134 in modified document 132.

In some examples, a difference between a value of an element in matrix 220 and a value of a corresponding element in matrix 240 may be effective to modify a formatting feature such as a space in document 122. For example, when element 226 is "4" and when element 246 is "4.1", the difference of "0.1", which is equal to offset 236, may be effective to define a new size and/or position of space 124 and/or space 202 in document 122. The new size and/or position of space 124 and/or space 202 may be shown in modified document 132.

Processor 104 may transform matrix 240 into object position data 139. Processor 104 may apply object position data 139 to content data 120 to generate modified content data 130. In response to generation of modified content data 130, processor 104 may send modified content data 130 to user 150. Processor 104 may store offset matrix 230, matrix 220, and/or matrix 240 in memory 106. In some examples, processor 104 may store an indication of an association among identification 114, hash 204, and offset matrix 230 in memory 106. Processor 104 may store content data 120 or overwrite content data 120 with modified content data 130.

Figure 3:
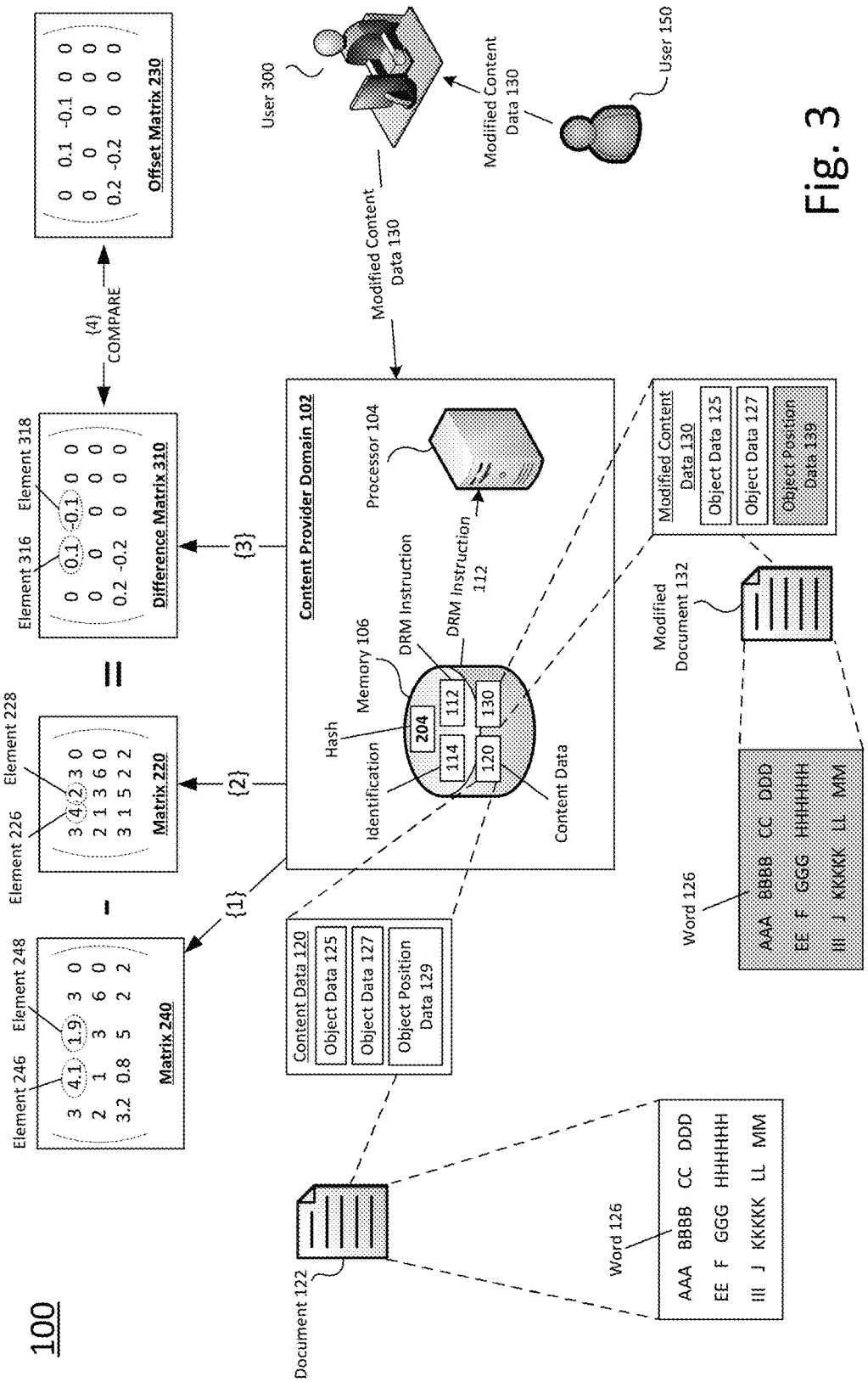
FIG. 3 illustrates the example system of FIG. 1 with additional detail relating to retrieving an identification from content data.

FIG. 3 illustrates the example system 100 of FIG. 1 with additional detail relating to retrieving an identification from content data, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

As will be described in more detail below, processor 104 may execute DRM instruction 112 to retrieve identification 114 from modified content data 130. In an example, processor 104 may receive modified content data 130 from a user, such as user 300, different from user 150. In some examples, user 150 may be a malevolent user who may share a copy of modified document 132 with another user, such as user 300, without distribution rights from content provider domain 102. In some examples, user 300 may be a malevolent user who may obtain a copy of modified document 132, such as from user 150, without access rights. In response to receipt of modified content data 130, processor 104 may transform object position data 139 in modified content data 130 into matrix 240 (depicted as operation {1}).

After transformation of object position data 139 into matrix 240, processor 104 may retrieve matrix 220 from memory 106 (depicted as operation {2}). In some examples, if matrix 220 is not stored in memory 106, processor 104 may transform object position data 129 from content data 120 into matrix 220. Processor 104 may subtract matrix 220 from matrix 240 to generate a difference matrix 310 (depicted as operation {3}). Difference matrix 310 may include one or more elements, such as an element 316 and an element 318, effective to indicate a difference between an object in modified document 132 and the object in document 122. For example, when element 316 is of a value "0.1" (or a non-zero value), element 316 may indicate that there exists a difference associated with word 126 such as a different position or different object size, etc.

After generation of difference matrix 310, processor 104 may retrieve offset matrix 230 from memory 106 and, in response, may compare difference matrix 310 with offset matrix 230. In some examples, if offset matrix 230 is not stored in memory 106, processor 104 may analyze hash 204 stored in memory 106 to generate offset matrix 230. Processor 104 may determine if difference matrix 310 is equivalent to offset matrix 230 such as by comparing difference matrix 310 with offset matrix 230 (depicted as operation {4}). If difference matrix 310 is equivalent to offset matrix 230, processor 104 may search for identification 114, such as by analyzing the indication of the association among identification 114, hash 204, and offset matrix 230, in memory 106. Processor 104 may further retrieve identification 114 from memory 106 based on a result of the analysis.

Figure 4:
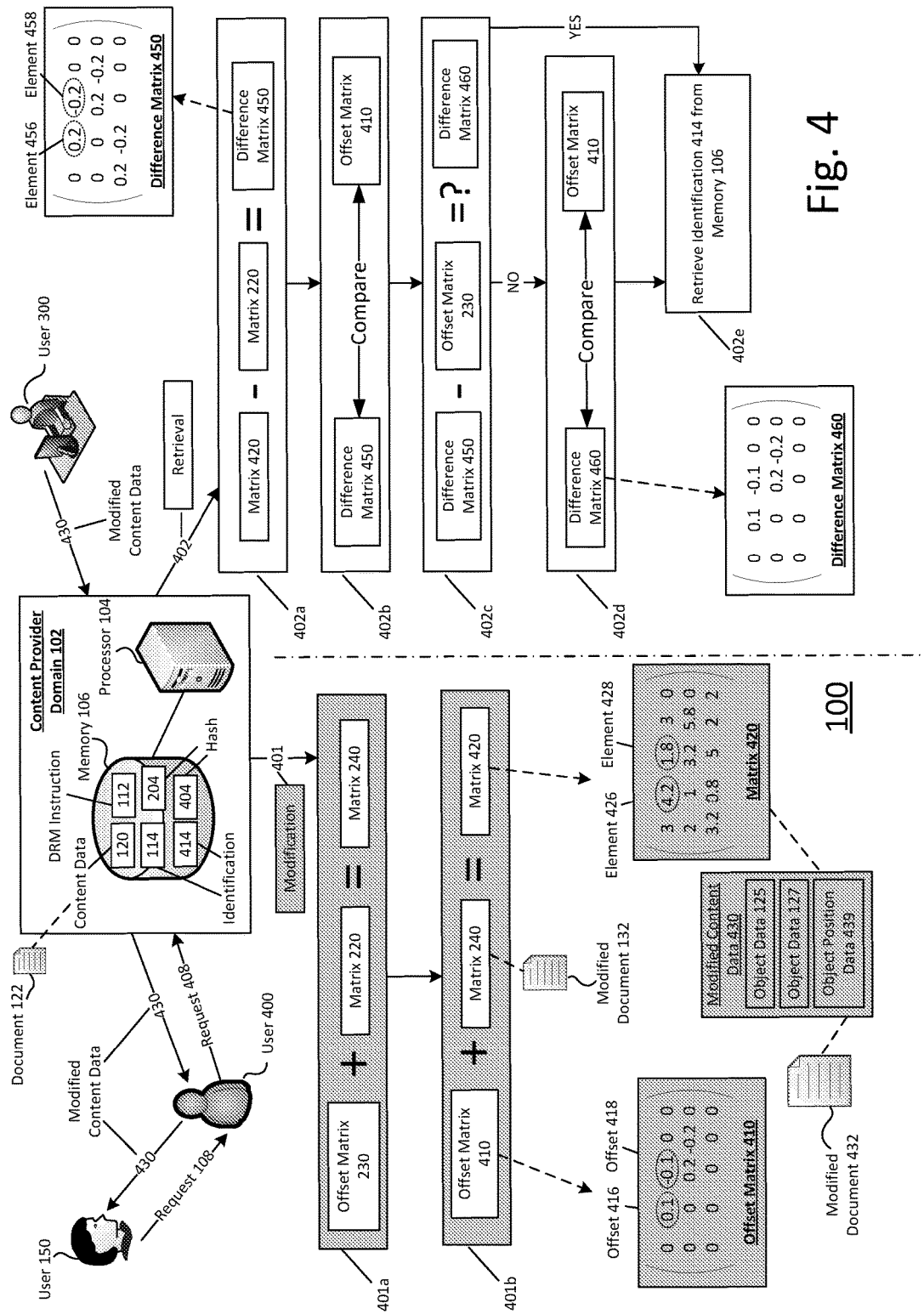
FIG. 4 illustrates the example system of FIG. 1 with additional detail relating to generation of modified content data using two identifications.

FIG. 4 illustrates the example system 100 of FIG. 1 with additional detail relating to generation of modified content data using two identifications, arranged in accordance with at least some embodiments described herein. FIG. 4 is substantially similar to system 100 of FIG. 1, with additional details. Those components in FIG. 4 that are labeled identically to components of FIG. 1 will not be described again for the purposes of clarity.

As will be described in more detail below, focusing on modification 401, processor 104 may execute DRM instruction 112 to generate modified content data 130 based on identification 114, and then further generate modified content data 430 based on modified content data 130 and an identification 414 associated with a user 400. Modified content data 430 may be data associated with a modified document 432 and may include object data 125, object data 127 and object position data 439. In an example, user 400 may have distribution rights from content provider domain 102 and user 150 may wish to read document 122. User 150 may send a request 108, which may be a request for document 122, to user 400. Request 408 may include an indication of identification 414. User 400 may receive request 108, and in response, may generate request 408 and send request 408 to content provider domain 102. Request 408 may include the indication of identification 114 and the indication of identification 414.

Processor 104 may receive request 408 from user 400 and in response, may perform modification 401 to modify content data 120. Modification 401 may include at least one operation as shown by blocks 401a and 401b. Modification 401 may begin at block 401a. At block 401a, processor 104 may execute DRM instruction 112 to generate offset matrix 230 using hash 204 generated from identification 114. Processor 104 may further generate matrix 240 such as by summing offset matrix 230 with matrix 220.

Modification 401 may continue from block 401a to block 401b. At block 401b, processor 104 may hash identification 414 to generate hash 404 and, in response, may store hash 404 in memory 106. Processor 104 may generate offset matrix 410 based on indications provided by hash 404. Offset matrix 410 may include one or more elements, such as an offset 416 and an offset 418, effective to modify positions of objects in modified document 132. Elements in offset matrix 410 may be arranged in rows and columns. In response to the generation of offset matrix 410, processor 104 may sum offset matrix 410 and matrix 240 to generate a matrix 420. Matrix 420 may include one or more elements such as an element 426 and an element 428. Elements in matrix 420 may be arranged in rows and columns, where each row refers to a line in modified document 432 and each column refers to a position of an object in a respective row. In the example, element 426 of matrix 420 may be associated with word 126 in modified document 432, and element 428 of matrix 220 may be associated with word 128 in modified document 432.

Processor 104 may transform matrix 420 into object position data 439. Processor 104 may apply object position data 439 to content data 120 to generate modified content data 430. In response to generation of modified content data 430, processor 104 may send modified content data 430 to user 150, which may be forwarded to user 400 by user 150. Processor 104 may store offset matrix 230, matrix 220, matrix 240, offset matrix 410, and/or matrix 420 in memory 106. In some examples, processor 104 may store a first indication of an association among identification 114, hash 204, and offset matrix 230, and may store a second indication of an association among identification 414, hash 404, and offset matrix 410 in memory 106.

In an example, processor 104 may receive modified content data 430 from a user different from user 150 and/or user 400, such as user 300. In response to receipt of modified content data 430, processor 104 may perform retrieval 402 to retrieve identification 414 and/or identification 114 from modified content data 430. Identification 114 may be retrieved in a manner as discussed above and will not be repeated for the sake of brevity. Identification 114 may identify user 150. Retrieval 402 may include at least one operation as shown by blocks 402a, 402b, 402c, 402d, and/or 402e. Retrieval 402 may begin at block 402a. At block 402a, processor 104 may transform object position data 439 in modified content data 430 into matrix 420. After transformation of object position data 439 into matrix 420, processor 104 may retrieve matrix 220 from memory 106. Processor 104 may subtract matrix 220 from matrix 420 to generate a difference matrix 450. Difference matrix 450 may include one or more elements, such as an element 456 and an element 458, effective to indicate a difference between an object in modified document 432 and the object in document 122.

Retrieval 402 may continue from block 402a to block 402b. At block 402b, processor 104 may compare difference matrix 450 with offset matrix 410, which corresponds to identification 414. Processor 104 may determine that difference matrix 450 is not equivalent to offset matrix 410 and in response, may retrieve offset matrix 230 from memory 106. Retrieval 402 may continue from block 402b to block 402c. At block 402c, processor 104 may subtract offset matrix 230 from difference matrix 450 to generate difference matrix 460. Retrieval 402 may continue from block 402c to block 402d. At block 402d, processor 104 may compare difference matrix 460 with offset matrix 410. Processor 104 may determine that difference matrix 460 is equivalent to offset matrix 410 and in response, retrieval 402 may continue from block 402d to block 402e. At block 402e, processor 104 may search for identification 414, such as by analyzing the indication of the association among identification 414, hash 404, and offset matrix 410, in memory 106. Processor 104 may further retrieve identification 414 from memory 106 based on a result of the analysis and identify user 400.

Among other possible benefits, a system in accordance with the disclosure may benefit owners of digital content. When an owner of digital content finds an illegal copy of the digital content, the owner may identify a malevolent user who may be responsible for an act of illegal distribution or copying. The system may allow a significant number of possible ways to embed an identification in the digital content due to large amounts of formatting features in a document, such as spaces, commas, periods, colon, between words. Also, the system may allow embedding an identification into the digital content without a need to change the meaning of the content.

Figure 5:
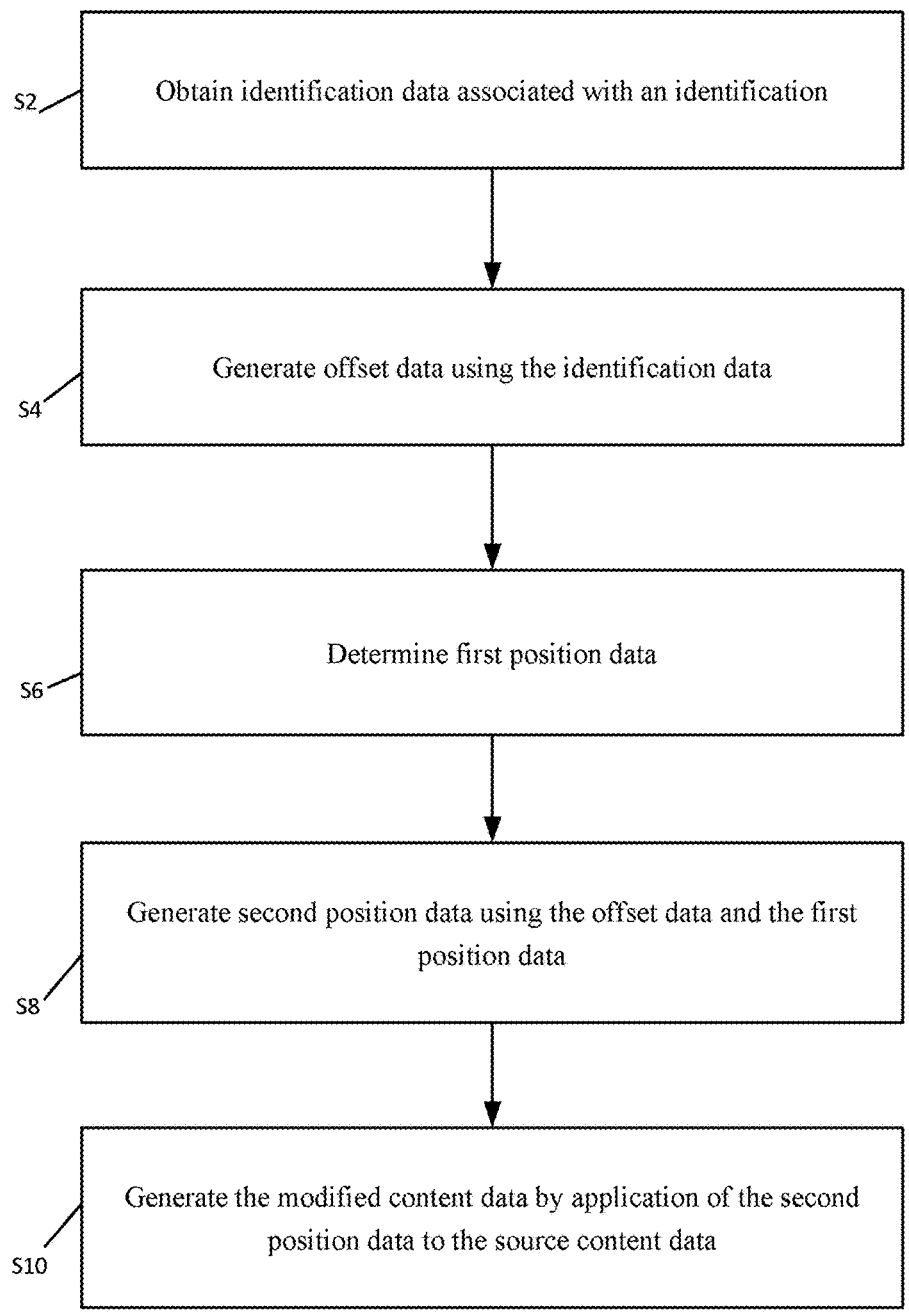
FIG. 5 illustrates a flow diagram for an example process for implementing digital rights management based on a formatting feature.

FIG. 5 illustrates a flow diagram for an example process for implementing digital rights management based on a formatting feature, arranged in accordance with at least some embodiments presented herein. The process in FIG. 5 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Obtain identification data associated with an identification". At block S2, a processor may obtain identification data associated with an identification. In some examples, the identification may be associated with a request for a source document.

Processing may continue from block S2 to block S4, "Generate offset data using the identification data". At block S4, the processor may generate offset data using the identification data. The offset data may include an indication of the identification. In some examples, the processor may hash the identification to generate the offset data. In some examples, the processor may further transform the offset data into an offset matrix.

Processing may continue from block S4 to block S6, "Determine first position data". At block S6, the processor may determine first position data that may be effective to define a first position of a first object and may be effective to define a second position of a second object in the source document. The source document may correspond to source content data. In some examples, the processor may further transform the first position data into a first matrix.

Processing may continue from block S6 to block S8, "Generate second position data using the offset data and the first position data". At block S8, the processor may generate second position data using the offset data and the first position data. The second position data may be effective to define a third position of the first object and may be effective to define a fourth position of the second object. In some examples, the third and fourth positions may be in the source document. In some examples, the third and fourth positions may be in a modified document. In some examples, the processor may sum the offset matrix and the first matrix to generate a second matrix. The processor may further transform the second matrix into the second position data.

Processing may continue from block S8 to block S10, "Generate modified content data by application of the second position data to the source content data". At block S10, the processor may generate modified content data by application of the second position data to the source content data. The modified content data may be associated with the modified document.

Figure 6:
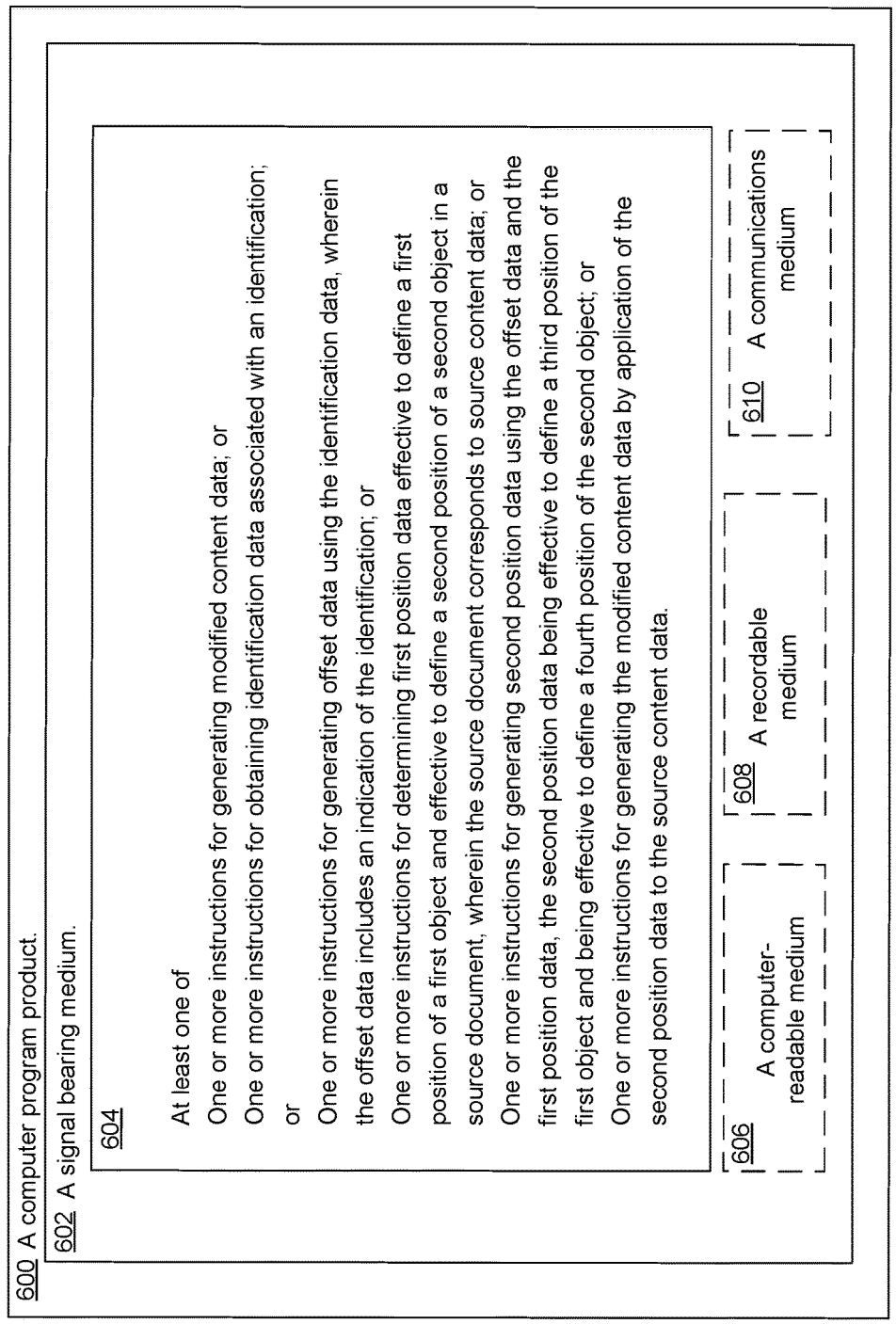
FIG. 6 illustrates an example computer program product that can be utilized to implement digital rights management based on a formatting feature.

FIG. 6 illustrates an example computer program product 600 that can be utilized to implement digital rights management based on a formatting feature, arranged in accordance with at least some embodiments described herein. Computer program product 600 may include a signal bearing medium 602. Signal bearing medium 602 may include one or more instructions 604 that, when executed by, for example, a processor, may provide the functionality described above with respect to FIGS. 1-5. Thus, for example, referring to system 100, processor 104 may undertake one or more of the blocks shown in FIG. 5 in response to instructions 604 conveyed to the system 100 by signal bearing medium 602.

In some implementations, signal bearing medium 602 may encompass a computer-readable medium 606, such as, but not limited to, a hard disk drive (HDD), a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, computer program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

FIG. 7 is a block diagram illustrating an example computing device 700 that is arranged to implement digital rights management based on a formatting feature, arranged in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a digital rights management based on a formatting feature algorithm 726 that is arranged to perform the functions as described herein including those described with respect to system 100 of FIGS. 1-5. Program data 724 may include digital rights management based on a formatting feature data 728 that may be useful for implementation of digital rights management based on formatting feature as is described herein. In some embodiments, application 722 may be arranged to operate with program data 724 on operating system 720 such that implementations of digital rights management based on formatting feature may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate modified content data, the method comprising, by a processor:

obtaining identification data associated with an identification, wherein the identification is associated with a user;

generating offset data using the identification data, wherein the offset data includes an indication of the identification associated with the user;

determining first position data effective to define a first position of a first object and effective to define a second position of a second object in a source document, wherein the source document corresponds to source content data;

generating second position data using the offset data and the first position data, the second position data being effective to define a third position of the first object and being effective to define a fourth position of the second object; and generating the modified content data, by application of the second position data to the source content data, wherein the modified content data facilitates a determination that a particular user among a plurality of users has rights to access the modified content data.

2. The method of claim 1, wherein the modified content data is associated with a modified document that includes the first and second objects, the second position data being effective to define the third position of the first object in the modified document, and the second position data being effective to define the fourth position of the second object in the modified document.

3. The method of claim 1, wherein the modified content data is associated with the source document, the second position data being effective to define the third position of the first object in the source document, and the second position data being effective to define the fourth position of the second object in the source document.

4. The method of claim 1, wherein generating the offset data comprises hashing the identification.

5. The method of claim 1, wherein obtaining the identification data comprises receiving a request for the source document, and the identification is associated with the request.

6. The method of claim 1, wherein determining the first position data comprises:
retrieving the source content data;
generating the first position data using at least a portion of the source content data; and
storing the first position data in a memory.

7. The method of claim 1, wherein:
the first position of the first object and the second position of the second object in the source document define a feature formed by the first and second objects; and
generating the modified content data includes modifying the feature.

8. The method of claim 7, wherein the first object is a first word, the second object is a second word, and the feature is a space formed between the first word and the second word in the source document.

9. The method of claim 7, wherein generating the offset data comprises:
determining a positive offset that corresponds to the feature; and
in response to the determination of the positive offset, determining a negative offset that corresponds to the feature, wherein the positive offset and the negative offset are of a same magnitude, and wherein the offset data includes the positive offset and the negative offset.

10. The method of claim 1, wherein generating the second position data comprises:
transforming the offset data into an offset matrix;
transforming the first position data into a first matrix;
summing the offset matrix and the first matrix to generate a second matrix; and
transforming the second matrix into the second position data.

11. A system effective to generate modified content data, the system comprising:
a memory configured to store source content data associated with a source document, the source content data includes first position data that is effective to define a first position of a first object and a second position of a second object in the source document; and
a processor configured to be in communication with the memory, the processor being configured to:
obtain identification data associated with an identification, wherein the identification is associated with a user;
generate offset data with use of the identification data, wherein the offset data includes an indication of the identification associated with the user;
determine the first position data;
generate second position data using the offset data and the first position data, the second position data being effective to define a third position of the first object and a fourth position of the second object;
generate the modified content data by application of the second position data to the source content data; and
store the modified content data in the memory, wherein the modified content data facilitates a determination that a particular user among a plurality of users has rights to access the modified content data.

12. The system of claim 11, wherein the modified content data is associated with a modified document that includes the first and second objects, the second position data being effective to define the third position of the first object in the modified document, and the second position data being effective to define the fourth position of the second object in the modified document.

13. The system of claim 11, wherein the modified content data is associated with the source document, the second position data being effective to define the third position of the first object in the source document, and the second position data being effective to define the fourth position of the second object in the source document.

14. The system of claim 11, wherein:
the first position of the first object and the second position of the second object in the source document define a feature formed by the first and second objects, and
generation of the modified content data includes a modification of the feature.

15. The system of claim 11, wherein the processor is further configured to:
transform the offset data into an offset matrix;
transform the first position data into a first matrix;
sum the offset matrix and the first matrix to generate a second matrix; and
transform the second matrix into the second position data.

16. A method to generate modified content data, the method comprising, by a processor:
receiving a request to modify content data, wherein the request includes an identification associated with a user;
generating offset data based on the identification associated with the user;
determining first position data effective to define a first position of a first object and effective to define a second position of a second object in the content data;
generating second position data based on the offset data, the second position data effective to define respective positions of the first object and the second object; and
applying the second position data to the content data to generate the modified content data, wherein the modified content data facilitates a determination that a particular user among a plurality of users has rights to access the modified content data.

17. The method of claim 16, wherein the modified content data is associated with a modified document that includes the first and second objects, the second position data being effective to define a third position of the first object in the modified document, and the second position data being effective to define a fourth position of the second object in the modified document.

18. The method of claim 16, wherein the modified content data is associated with a source document, the second position data being effective to define a third position of the first object in the source document, and the second position data being effective to define a fourth position of the second object in the source document.

19. The method of claim 16, wherein generating the offset data comprises hashing the identification.

20. The method of claim 16, wherein:
   the first position of the first object and the second position of the second object in a source document define a feature formed by the first and second objects; and
   the application of the second position data includes modifying the feature.

21. The method of claim 20, wherein the first object is a first word, the second object is a second word, and the feature is a space formed between the first word and the second word in the source document.

22. The method of claim 20, wherein generating the offset data comprises:
   determining a positive offset that corresponds to the feature; and
   in response to the determination of the positive offset, determining a negative offset that corresponds to the feature, wherein the positive offset and the negative offset are of a same magnitude, and wherein the offset data includes the positive offset and the negative offset.

\* \* \* \* \*